United States Patent
Chafle et al.

(10) Patent No.: US 7,388,839 B2
(45) Date of Patent: Jun. 17, 2008

(54) METHODS, APPARATUS AND COMPUTER PROGRAMS FOR MANAGING PERFORMANCE AND RESOURCE UTILIZATION WITHIN CLUSTER-BASED SYSTEMS

(75) Inventors: Girish Bhimrao Chafle, New Delhi (IN); Mangala Gowri Nanda, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 1202 days.

(21) Appl. No.: 10/690,693

(22) Filed: Oct. 22, 2003

(65) Prior Publication Data

US 2005/0088976 A1 Apr. 28, 2005

(51) Int. Cl.
*H04L 12/26* (2006.01)
(52) U.S. Cl. .................... 370/236; 370/252
(58) Field of Classification Search ........... 370/236, 370/252, 395.21, 465; 709/203, 224, 228
See application file for complete search history.

(56) References Cited

U.S. PATENT DOCUMENTS

| | | | |
|---|---|---|---|
| 5,918,017 A | 6/1999 | Attanasio et al. | |
| 6,496,866 B2 | 12/2002 | Attanasio et al. | |
| 2002/0055980 A1 | 5/2002 | Goddard | |
| 2002/0055982 A1 | 5/2002 | Goddard | |
| 2002/0055983 A1 | 5/2002 | Goddard | |
| 2002/0093917 A1* | 7/2002 | Knobbe et al. | 370/252 |
| 2002/0166080 A1 | 11/2002 | Attanasio et al. | |
| 2006/0075107 A1* | 4/2006 | Steinwagner | 709/227 |

OTHER PUBLICATIONS

M.Aron, D.Sanders, P.Druschel, and W.Zwaenepoel, "Scalable content-aware request distribution in cluster-based network servers" *Proceedings of 2000 USENIX Annual Technical Conference*, Jun. 2000, San Diego, USA.
A.Fox, S. D.Gribble, Y.Chawathe, E.A.Brewer and P.Gauthier, "Cluster-Based Scalable Network Services", *Proceedings of the Sixteenth ACM Symposium on Operating Systems Principles*, Oct. 1997.
H.Zhu, B.Smith and T.Yang, "Scheduling optimization for resource-intensive web requests on server clusters", *Proceedings of the Eleventh Annual ACM Symposium on Parallel Algorithms and Architectures*, Jun. 1999.

(Continued)

*Primary Examiner*—Aung S. Moe
*Assistant Examiner*—Feben M Haile
(74) *Attorney, Agent, or Firm*—Gibb & Rahman, LLC

(57) ABSTRACT

Disclosed are methods, apparatus and computer programs for improving performance and resource utilization of cluster-based data processing systems. The number of persistent connections between first and second data processing units of a system is adjusted according to monitored performance of communications between the nodes. The monitored performance measure is the queuing delay between the nodes, and the number of connections is increased and decreased as changing load conditions increase and decrease the queuing delay. A method of establishing and closing persistent connections in response to a monitored queuing-delay between a front-end gateway computer and each of a cluster of back-end servers is used to improve the performance of a cluster-based Web server or provision of Web services. Unwanted connections are closed to enable system resources to be allocated to other processes.

1 Claim, 7 Drawing Sheets

OTHER PUBLICATIONS

M.Aron, P.Druschel and W.Zwaenepoel, "Efficient Supoport for P-HTTP in Cluster-Based Web Servers", *Proceedings of 1999 USENIX Annual Technical Conference*, Jun. 1999.

E.Casalicchio and M.Colajanni, "A Client-Aware Dispatching Algorithm for Web Clusters Providing Multiple Services", *Proceedings of the 10th International World Wide Web Conference*, May 2001.

V.S.Pai, M.Aron, G.Banga, M.Svendsen, P.Druschel, W.Zwaenepoel, and E.Nahum, "Locality-Aware Request Distribution in Cluster-Based Network Servers", *Proceedings of 8th ACM Conference on Architectural Support for Programming Languages and Operating Systems*, Oct. 1998.

M.Welsh, D.Culler and E.Brewer, "SEDA: An Architecture for Well-Conditioned, Scalable Internet Services", *Proceedings of 18th Symposium on Operating Systems Principles(SOSP'01)*, Oct. 2001.

M.Welsh, S.D.Gribble, E.A.Brewer and D.Culler, "A Design Framework for Highly Concurrent Systems", Technical Report UCD/CSD-00-1108, UC Berkeley, Apr. 2000.

F. Silla and J. Duato "On the Use of Virtual Channels in Networks of Workstations with Irregular Topology", IEEE Transactions on Parallel and Distributed Systems, vol. 11, No. 8, Aug. 2000, pp. 813-828.

R. Agrawal, R.J. Bayardo, D. Gruhl and S. Papadimitriou, "Vinci: A Service-Oriented Architecture for Rapid Development of Web Applications," *Proceedings of 10th International World Wide Web Conference*, May 2001.

H. Zhu, T. Yang, Q. Zheng, D. Watson, O.H. Ibarra, and T. Smith, "Adaptive Load Sharing for Clustered Digital Library Servers,"*Proceedings of the Seventh IEEE International Symposium on High Performance Distributed Computing* (HPDC-7), Jul. 1998.

J. Nieh, C. Vail, and H. Zong, "Virtual-time round-robin: An o(1) proportional share scheduler," *Proceedings of the 2001 USENIX Annual Technical Conference*, Jun. 2001.

D. Petrou, J. W. Milford, and G. A. Gibson, "Implementing lottery scheduling: Matching the specializations in traditional schedulers," *Proceedings of the 1999 USENIX Annual Technical Conference*, Jun. 1999.

L.F. Menditto, J. Skogman and G. Sunday, "Single System Image and Load Balancing for Network Access to a Loosely Completed Complex," IBM Technical Disclosure Bulletin, vol. 34, No. 9, Feb. 1992.

\* cited by examiner

US 7,388,839 B2

METHODS, APPARATUS AND COMPUTER PROGRAMS FOR MANAGING PERFORMANCE AND RESOURCE UTILIZATION WITHIN CLUSTER-BASED SYSTEMS

FIELD OF INVENTION

The present invention relates to methods, apparatus and computer programs for managing performance or resource utilization, or both performance and resource utilisation, for data processing systems such as cluster-based systems.

BACKGROUND

Cluster-based architectures are a useful platform for hosting many Internet applications such as Web servers or Web services. A cluster-based system includes a front-end (gateway) node connected by a local area network to a set of back-end nodes. The front-end node receives the requests and forwards it to a back-end node where the actual processing of the request takes place. There are many advantages to a cluster based system, including incremental scalability, increased availability and performance, cost control and maintenance. Hence, clusters are used for scalable Web servers, as described by M. Aron, D. Sanders, P. Druschel, and W. Zwaenepoel, in "Scalable Content-Aware Request Distribution in Cluster-based Network Servers", *Proceedings of* 2000 *USENIX Annual Technical Conference*, June 2000, and described by M. Aron, P. Druschel and W. Zwaenepoel in "Efficient Support for P-HTTP in Cluster-based Web Servers", *Proceedings of* 1999 *USENIX Annual Technical Conference*, June 1999.

A specific technique for content-based request distribution within cluster-based network servers is described by V. S. Pai, M. Aron, G. Banga, M. Svendsen, P. Druschel, W. Zwaenepoel, and E. Nahum in "Locality-Aware Request Distribution in Cluster-based Network Servers", *Proceedings of* 8*th ACM Conference on Architectural Support for Programming Languages and Operating Systems*, October 1998. Locality-aware request distribution (LARD) involves dividing data into partitions on the back-end servers and using a front-end to distribute incoming requests in a manner that takes account of where the data is stored.

A cluster-based architecture is also suitable for the provision of Web services, as described by E. Casalicchio and M. Colajanni in "A Client-Aware Dispatching Algorithm for Web Clusters Providing Multiple Services", *Proceedings of the* 10*th International World Wide Web Conference*, May 2001. The advantages of clusters for Internet service provision are described by A. Fox, S. Gribble, Y. Chawathe, E. Brewer and P. Gauthier in "Cluster-Based Scalable Network Services", *Proceedings of the Sixteenth ACM Symposium on Operating Systems Principles*, October 1997.

M. Welsh, D. Culler and E. Brewer, in "SEDA: An Architecture for Well-Conditioned, Scalable Internet Services", *Proceedings of* 18*th Symposium on Operating Systems Principles (SOSP '*01), October 2001, describe a framework for highly concurrent server applications which uses threading and aspects of event-based programming models to provide automatic tuning in response to large variations in load. The framework is referred to as the staged event-driven architecture (SEDA). Stages are separated by event queues and include controllers which dynamically adjust resource allocation and scheduling in response to changes in load. The size of each stage's thread pool is adjusted based on the monitored length of an event queue.

Various mechanisms have been tried to improve the performance of cluster based systems—including caching, load balancing and client hand-off (e.g. TCP hand-off). The front-end may distribute the requests such that the load among the back-end nodes is balanced and the load may be distributed based on the client, request content, current resource usage or scheduling algorithms. Load distribution based on clusters is known to improve the scalability, availability and fault tolerance of Internet services. Various hand-off mechanisms have been reported in literature for request forwarding. However these typically require changes in the operating system and are not portable.

In "On the Use of Virtual Channels in Networks of Workstations with Irregular Topology", IEEE Transactions on Parallel and Distributed Systems, Vol. 11, No. 8, August 2000, pages 813-828, F. Silla and J. Duato describe a flow control protocol for supporting a number of virtual channels in a network of workstations which implements adaptive routing. The flow control protocol uses channel pipelining and seeks to minimize control traffic.

Published U.S. patent application Ser. Nos. 2002/0055980, 2002/0055982 and 2002/0055983 (Goddard) describe a server computer, such as a cluster-based Web server, having a plurality of persistent connections to a dispatcher. The dispatcher monitors the performance of the back-end server and, in order to improve back-end server performance, controls either the number of concurrently processed data requests or the number of concurrently supported connections.

Although a lot of work has been done to improve the performance of cluster-based systems, there is scope for further irnprovement. For example, the existing cluster-based systems do not make effective use of the network bandwidth between the front-end and back-end nodes. Existing cluster-based systems do not fully exploit the benefits of multile connections. The existing systems are generally configured statically and do not adapt to the changing workload on the system. Further, the existing systems are generally based on direct network subsystems (e.g. TCP/IP) and do not exploit the benefits of the mediated network subsystems (e.g. Java Messaging Service).

SUMMARY

A first aspect of the present invention provides a method for managing connections between data processing units of a data processing system. Concurrency benefits are provided by establishing multiple persistent connections between first and second data processing units of the system. The optimal number of connections between the data processing units depends on the load on the system (such as the number of concurrent client requests) as well as the type of request (data-intensive/CPU-intensive) sent between the data processing units. The method includes the steps of monitoring communication delays for requests transferred from a first data processing unit to a second data processing unit of the system and, in response to the monitored communication delays indicating a predefined performance condition, modifying the number of persistent connections between the first and second data processing units.

A 'connection' in the context of the present application comprises the physical set-up of a communication channel between the connection end-points. Establishing a 'connection' typically includes exchanging and storing an identification of the addresses of the connection endpoints and the communication port numbers to be used, and reserving resources for use in communications via the connection— such as system memory and buffer storage areas. Subject to the available communication bandwidth, there may be a large number of connections defined for use over a single physical link between two computer systems. A 'persistent connection' is a connection which persists across multiple requests.

A first embodiment of the invention provides a method for managing persistent connections between data processing units of a computer system, wherein a first data processing unit is connected to a second data processing unit to send requests to the second data processing unit for processing, the method comprising the steps of:

monitoring a communication delay period for requests transferred from the first data processing unit to the second data processing unit;

comparing the monitored delay period with a threshold delay period to determine whether the monitored delay period indicates a predefined performance condition; and, in response to determining that the monitored delay period indicates the predefined performance condition, adjusting the number of connections between the first and second data processing units.

The method can be applied within cluster-based data processing systems for managing the number of persistent connections between a front-end 'dispatcher' or 'gateway' node and each of a cluster of back-end processing nodes of the system.

The communication delays can be calculated so as to exclude processing times at the second data processing unit, as follows. The communication delays monitored according to one embodiment of the invention are calculated as a difference between a first timestamp generated when sending a request from the first data processing unit and a second timestamp generated when a response from the second data processing unit is received at the first data processing unit, minus the time actually processing the request (which is measured at the second data processing unit). This calculated time period, corresponding to the difference between timestamps minus processing time, is termed the queueing delay. The affect on the queuing delay of the size and other characteristics of an individual request is not as great as the effect on total response times.

In a particular embodiment, the method is responsive to the monitored delay period exceeding a first threshold delay period to initiate establishment of at least one additional connection between the first and second data processing units (subject to the number of connections not exceeding a maximum, above which performance degrades for some load levels). The first threshold delay period is preferably determined as a value representing a minimum delay period for which the addition of one or more connections can reduce communication delays by an amount justifying the addition.

In one embodiment, a second threshold delay period is also defined and, in response to determining that the monitored delay period is less than the second threshold delay period, at least one connection between the first and second data processing units is deleted (subject to retaining at least one connection). The second threshold delay period is preferably identified as a delay period below which one or more connections can be deleted without increasing the delay period by an unacceptable amount.

A second embodiment of the invention provides a data processing system comprising:

a first data processing unit for receiving requests from a client requestor and passing received requests to a second data processing unit, and for receiving responses from the second data processing unit and forwarding received responses to the client requestor;

a second data processing unit for processing requests received from the first data processing unit to generate responses, and for forwarding the responses to the first data processing unit; and a connection manager for managing the number of connections between the first and second data processing units, the connection manager being responsive to monitored communication delays between the first and second data processing units indicating a predefined performance condition to modify the number of persistent connections between the first and second data processing units.

A third embodiment of the invention provides a data processing system comprising:

a network subsystem;

a gateway node for receiving requests from a client requestor and passing received requests to the network subsystem for delivery to one of a set of back-end processing nodes, and for receiving responses from the back-end processing nodes via the network subsystem and forwarding received responses to the client requestor; and a set of back-end processing nodes for processing requests received from the gateway node via the network subsystem to generate responses, and for forwarding the responses to the gateway node via the network subsystem;

a connection manager for managing the number of connections between the gateway node and each of the back-end processing nodes, the connection manager being responsive to monitored communication delays between the gateway node and the back-end processing nodes indicating a predefined performance condition to modify the number of persistent connections between the gateway node and at least a first one of the back-end processing nodes.

In one embodiment, communication delays are monitored and averaged for the set of back-end nodes and an equal number of connections is provided between each back-end node and the gateway node. In a preferred embodiment, the connection manager is responsive to the monitored communication delays exceeding a first delay threshold to increase the number of persistent connections between the gateway node and each back-end processing node, and is responsive to the monitored communication delays being less than a second delay threshold to decrease the number of persistent connections between the gateway node and each back-end processing node.

A further embodiment provides a method for managing persistent connections between a gateway node and each of a set of back-end processing nodes arranged in a cluster within a data processing system, the method comprising the steps of:

monitoring a communication delay period for requests transferred from the gateway node to the back-end processing nodes;

comparing the monitored communication delay period with a threshold communication delay period to determine whether the monitored communication delay period indicates a predefined performance condition; and, in response to determining that the monitored communication delay period indicates a predefined performance condition, adjusting the number of connections between the gateway node and at least one of the set of back-end nodes.

A further embodiment provides a computer program product, comprising program code recorded on a recording medium for controlling operations on a data processing system on which the program code executes, the program code comprising a connection manager for managing the number of connections between a first data processing unit and a second data processing unit of the system by:

monitoring a communication delay period for requests transferred from the first data processing unit to the second data processing unit, comparing the monitored communication delay period with a threshold communication delay period to determine whether the monitored communication delay period indicates a predefined performance condition; and, in response to determining that the monitored delay period indicates a predefined performance condition, adjusting the number of connections between the first and second data processing units.

Methods, systems and computer programs according to embodiments of the invention can be used to modify the number of connections between system nodes in response to varying load on a system, for systems which use either a mediated or a direct connection network subsystem. Also, methods and systems according to embodiments of the invention can work in conjunction with existing solutions—for example in conjunction with load balancing or in conjunction with adaptive containers—to further improve the performance of the system.

BRIEF DESCRIPTION OF DRAWINGS

Embodiments of the invention are described below in detail, by way of example, with reference to the accompanying drawings in which.

DETAILED DESCRIPTION OF EMBODIMENTS

Figure 1:
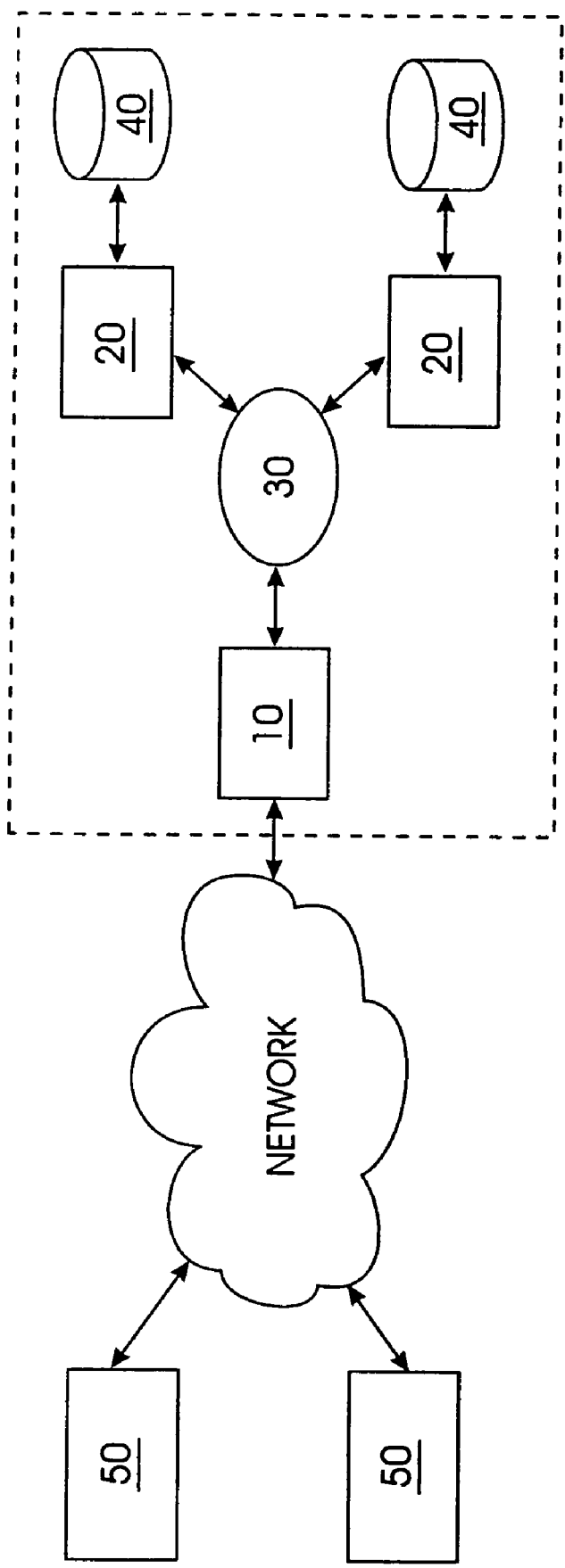
FIG. 1 is a schematic representation of a cluster-based system architecture.

Some portions of the following description are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is conceived to be a self-consistent sequence of steps leading to a desired result. The steps are those requiring physical manipulations of physical quantities. Usually these quantities take the form of electrical or magnetic signals capable of being stored, transferred, combined, compared, and otherwise manipulated. It is often convenient to refer to these signals as bits, values, elements, symbols, characters, numbers, or the like.

However, the above and similar terms are to be associated with the appropriate physical quantities and are merely convenient labels applied to these quantities. Unless specifically stated otherwise, it will be appreciated that throughout the present specification discussions utilising terms such as "computing", "calculating", "determining", "comparing", "generating", "selecting", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms presented herein are not inherently related to any particular computer or other apparatus. Various general purpose machines may be used with programs in accordance with the teachings herein. Alternatively, the construction of more specialised (apparatus to perform the required method steps may be appropriate.

In addition, the present specification also discloses a computer readable medium comprising a computer program for performing the operations of the methods. The computer readable medium is taken herein to include any transmission medium for communicating the computer program between a source and a destination. The transmission medium may include storage devices such as magnetic or optical disks, memory chips, or other storage devices suitable for interfacing with a general purpose computer. The transmission medium may also include a hard-wired medium such as exemplified in the Internet system, or wireless medium such as exemplified in the GSM mobile telephone system. Any computer program described herein is not intended to be limited to any particular programming language and implementation thereof. It will be appreciated that a variety of programming languages and coding thereof may be used to implement the teachings of the disclosure contained herein.

Where reference is made in any one or more of the accompanying drawings to steps or features which have the same reference numerals, those steps or features have the same function(s) or operation(s) for the purposes of this description, unless the contrary intention appears.

Cluster Overview

FIG. 1 shows a typical cluster-based system architecture in which the present invention may be implemented. A front-end node 10 acts as a gateway to the data processing nodes of the system, and is connected to the back-end nodes 20 by a network subsystem 30. The front-end node receives requests from clients 50 and is responsible for distributing the incoming requests to the back-end in a manner that is transparent to clients. The back-end nodes 20 carry out the main processing of the requests, accessing databases 40 as required, and return a response to clients 50 either directly or via the front-end node 10.

The present invention is not limited to specific data processing hardware, and the various architectural components shown in FIG. 1 may be implemented by any suitable data processing apparatus—including separate computing systems or separate data processing units integrated within a parallel processing system (for example, back-end nodes 20 may be separate processing units of a single system). The invention is, however, applicable to clustered Web servers in which Web server software is running on each of a plurality of back-end server computers. In that case, each of the back-end computers 20 cooperates with a gateway server 10.

The front and back end nodes are connected to each other by a network subsystem 30 which can be either a direct connection network subsystem or mediated connection network subsystem. In the direct connection subsystem (such as in a TCP/IP implementation), a persistent connection is open between the front and back end nodes; whereas in a mediated connection subsystem, the connection is via a broker sitting between the front and back end nodes. A persistent connection is one in which the connection persists across multiple requests, such that it is not necessary to create a new connection for each request. The front end and back end nodes each act as both a producer and consumer of messages.

A number of generic functions such as authentication, access control, load balancing, request distribution and resource management are handled by the front-end node. The front-end node runs a multi-threaded server providing these functions (i.e. a server which can handle concurrent requests), and leaves the back-end node to focus On the core service functions. Typically, the front-end distributes the requests such that the load among the back-end nodes is balanced.

With content-based request distribution, the front-end additionally-takes into account the content or type of service requested when deciding to which back-end node a client request should be assigned. Each back-end node is a multi-threaded server (Container) and provides the core service functionality. The generic term "Container" is used herein to denote the back-end node as it contains the Web service and is a generic server that may be listening on HTTP, TCP/IP or JMS connections.

System Architecture

An example system architecture is described below. A gateway is connected to a backend cluster to enable communications between them using push/pull methodology, and using a simple round robin algorithm for load balancing across the cluster of backend nodes.

The system includes the following components:

A Broker that facilitates "push/pull" communication.
A Gateway that accepts requests from clients over HTTP. The gateway:
  pushes the incoming requests to the broker by publishing the request on a specific Request Topic;
  pulls the response from the broker by subscribing to a corresponding Response Topic on the broker; and
  returns the response to the client over the open HTTP connection.
A cluster of back-end nodes. Each back-end node is a server that:
  Deploys/Contains the Web Service;
  Pulls requests from the broker by subscribing to the Request Topic and invokes the relevant web service; and
  Pushes the response from the web service to the broker by publishing the response on the Response Topic.

In push/pull systems, once a publisher (or subscriber) establishes a topic for publishing (or subscribing), the publisher (or subscriber) keeps a persistent connection with the broker and pushes (pulls) the data over the persistent connection.

Let there be N back-end containers $C_1, C_2, \ldots, C_N$. Initially, there is exactly one Request Topic "ReqTopic$C_i^1$" and one Response Topic "ResTopic$C_i^1$" per back-end container, $C_i$. Thus, there is one persistent connection between the Gateway and each back-end container via the broker. As each request is received by the gateway from the clients, the gateway publishes the first request on the topic "ReqTopic$C_1^1$", the second request on the topic "ReqTopic$C_2^1$", and so on till the Nth request is published on "ReqTopic$C_N^1$". The (N+1)th request will then be published again on "ReqTopic$C_1^1$" and so on in Round Robin fashion.

When the load increases, several requests may be pipelined on the same connection. That is, several requests are sent via the same connection without waiting for the gateway to complete its execution of a request before the next request is sent. Similar pipelining is used for responses. Under heavy loads, the connection pipeline may become 'full'—that is, the computer memory and buffers reserved for the connection become full and no further requests (or responses) can be added until existing requests (or responses) have been processed. This leads to a delay in transferring the request (or response) onto the connection pipeline, and a consequent delay in transferring the request from the gateway to the back-end node and from the back-end to the gateway. This delay is termed the queuing delay.

To reduce the queuing delay, the number of persistent connections between the gateway and each back-end container may be increased. For example, if the number of persistent connections is increased to 3, then the Request topics used will be, "ReqTopic$C_1^1$", "ReqTopic$C_1^2$" and "ReqTopic$C_1^3$" for back-end container $C_1$, and similarly for the remaining containers. Corresponding Response topics are also generated. This is described in more detail below. The establishment of each new connection involves reserving system memory and buffer space and exchanging communication port numbers and network addresses for use in the transfer of data between the connection end points. Establishment of a new connection can also involve defining the communication protocol and quality of service parameters (in some systems) or registering with a broker (in mediated connection systems). Deleting a connection returns the reserved resources to the system for other uses. The allocation of requests to the multiple connections uses a round-robin approach—although the invention is not limited to any specific workload sharing or load balancing algorithm.

Performance Characteristics

The performance of the system is measured in terms of throughput—the total number of requests served by the system in a given amount of time. The time over which throughput is measured is termed the cycle time. Throughput is influenced by the following three parameters:
  Number of concurrent clients;
  Length of the message (response from the container) exchanged between front-end and back-end nodes for each request; and
  Computational activity (CPU load) required for each request at the back end node (container).

The first of these parameters loads the entire system whereas the other two parameters load the back-end containers. It has been observed that an increase in message size (such as when handling increasingly data-intensive requests)

or an increase in computational activity (such as when handling increasingly compute-intensive requests) essentially has the same effect—both types of loading of the container result in a decrease in throughput. As the load on the system is increased, the pipeline between the gateway and the back-end node becomes utilized to its full capacity. This results in an inability to increase throughput via the existing connection, with a consequent increase in the queuing delay.

As described in detail below (in section 'Specific System Architecture and Algorithm'), it is possible to increase the number of connections within the constraints of the available bandwidth (which is substantial for a typical cluster-based system). This can reduce the queuing delay by increasing the number of persistent connections between the back-end and front-end nodes, thereby improving the overall system performance. FIG. 2 shows the effect of the number of persistent connections on throughput for heavy request loads.

Figure 2A:
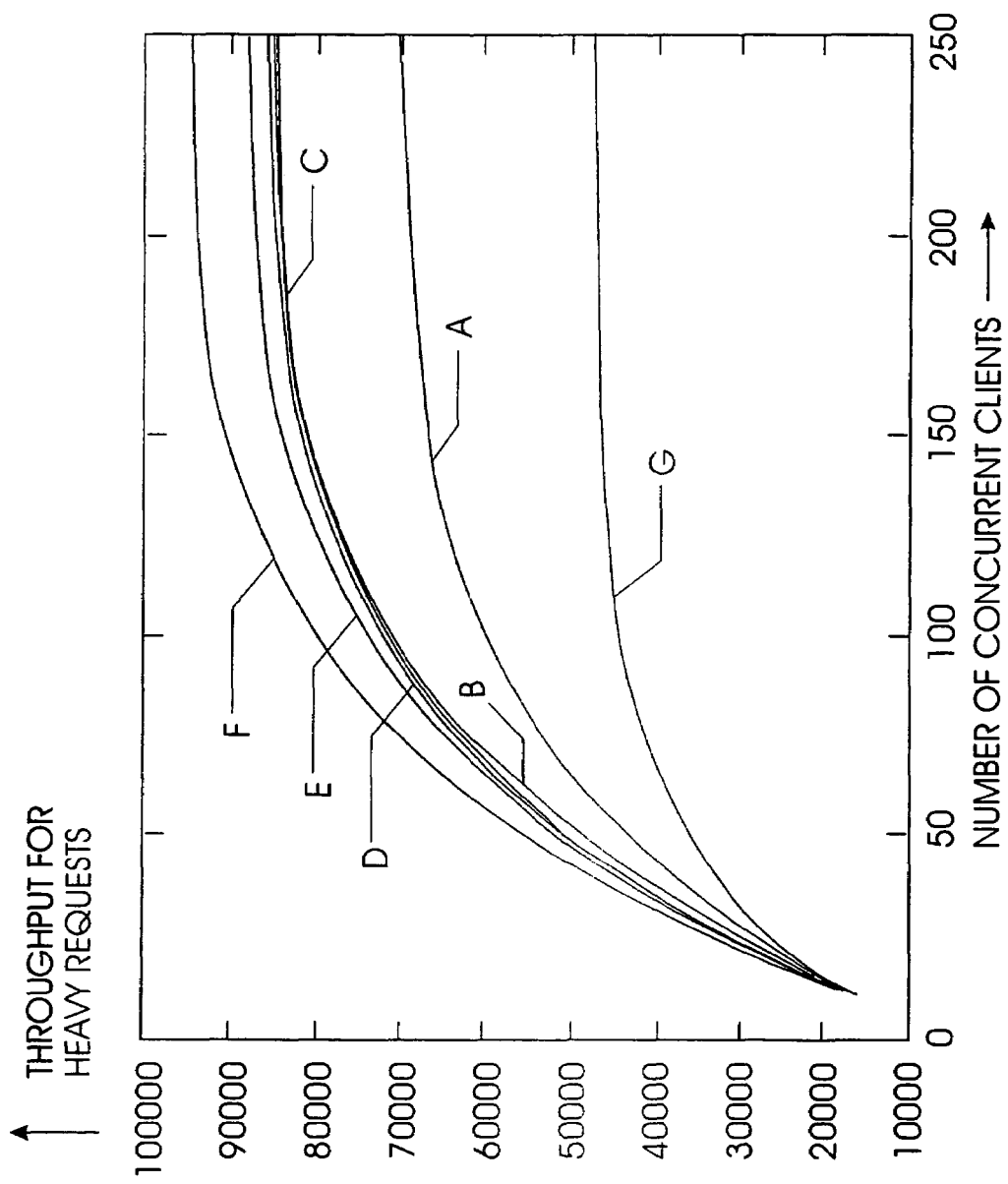
FIG. 2A is a graphical representation of the variation in throughput with the number of connections, showing the effect of concurrency on performance.

In particular, FIG. 2A shows the effect of concurrency on performance in terms of the variation in throughput according to changes in the number of connections. Each curve represents a different number of persistent connections as follows: Curve A represents 1 connection; B represents 5 connections; C represents 15 connections; D represents 20 connections; E represents 30 connections; F represents 60 connections; and G represents 90 connections.

Figure 2B:
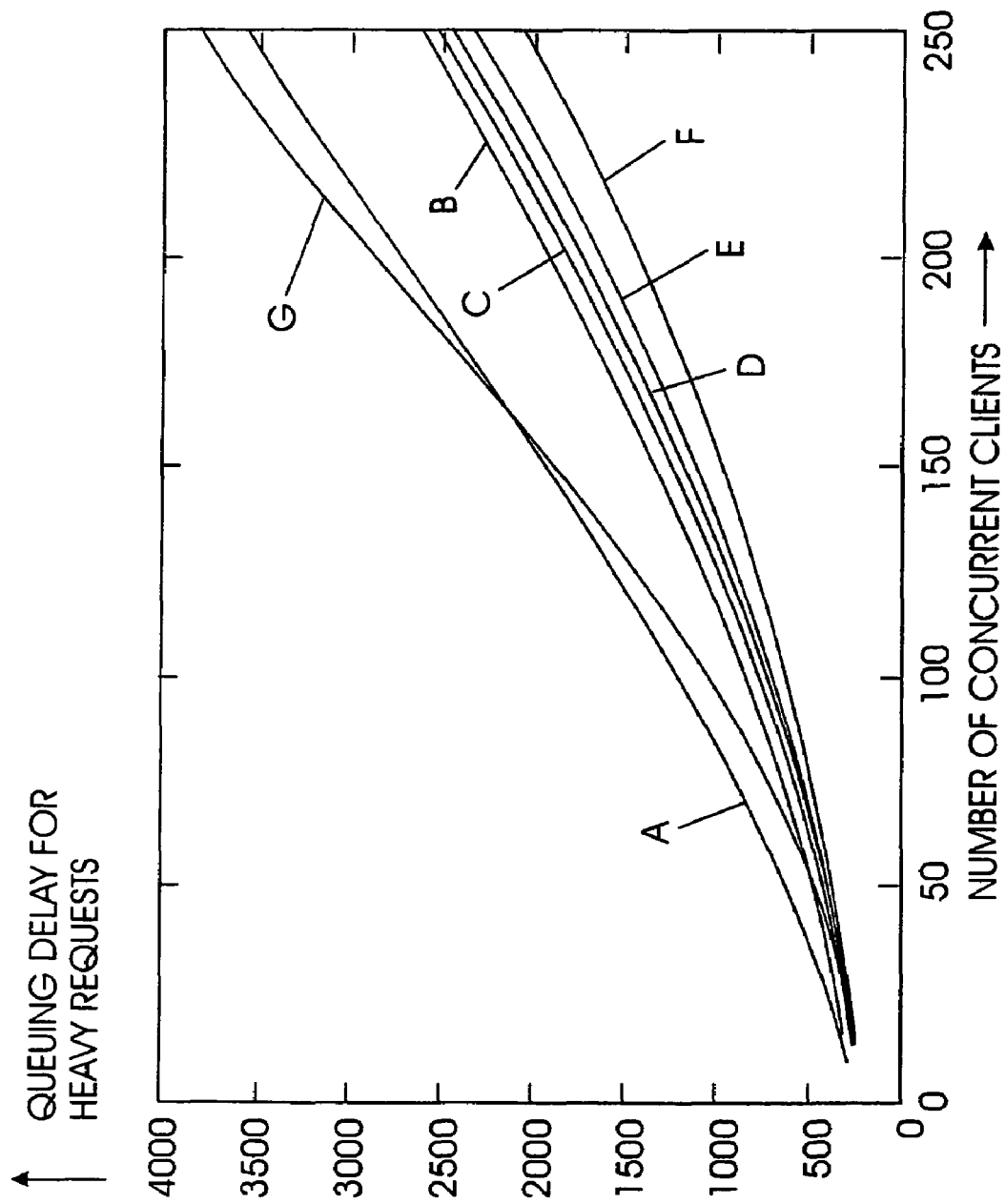
FIG. 2B is a graphical representation of the variation in queuing delay with the number of connections, showing the effect of concurrency on performance.

FIG. 2B shows the effect of concurrency on performance, in terms of the variation in queuing delay according to the number of connections. In FIG. 2B, the labelled curves each represent a different number of persistent connections as follows: A=1, B=5, C=15, D=20, E=30, F=60, and G=90.

As shown in FIG. 2A, the throughput of the system for a given number of concurrent clients increases with increases in the number of persistent connections, up to a point beyond which it starts to degrade (as exemplified by curve G). Similar behavior is reflected in FIG. 2B—the queuing delay reduces as a result of increasing the number of connections—up to a point beyond which it again increases (as exemplified by curve G). Thus, there is an upper bound on the number of connections beyond which increasing the number of connections brings no further performance benefits and can be detrimental. This deterioration of performance and increase of queuing delay if the number of connections is allowed to exceed a maximum number is partly due to contention for resources such as available buffer storage/system memory, and partly because of processing overheads such as synchronization. This behavior is shown more clearly in FIG. 3.

Figure 3:
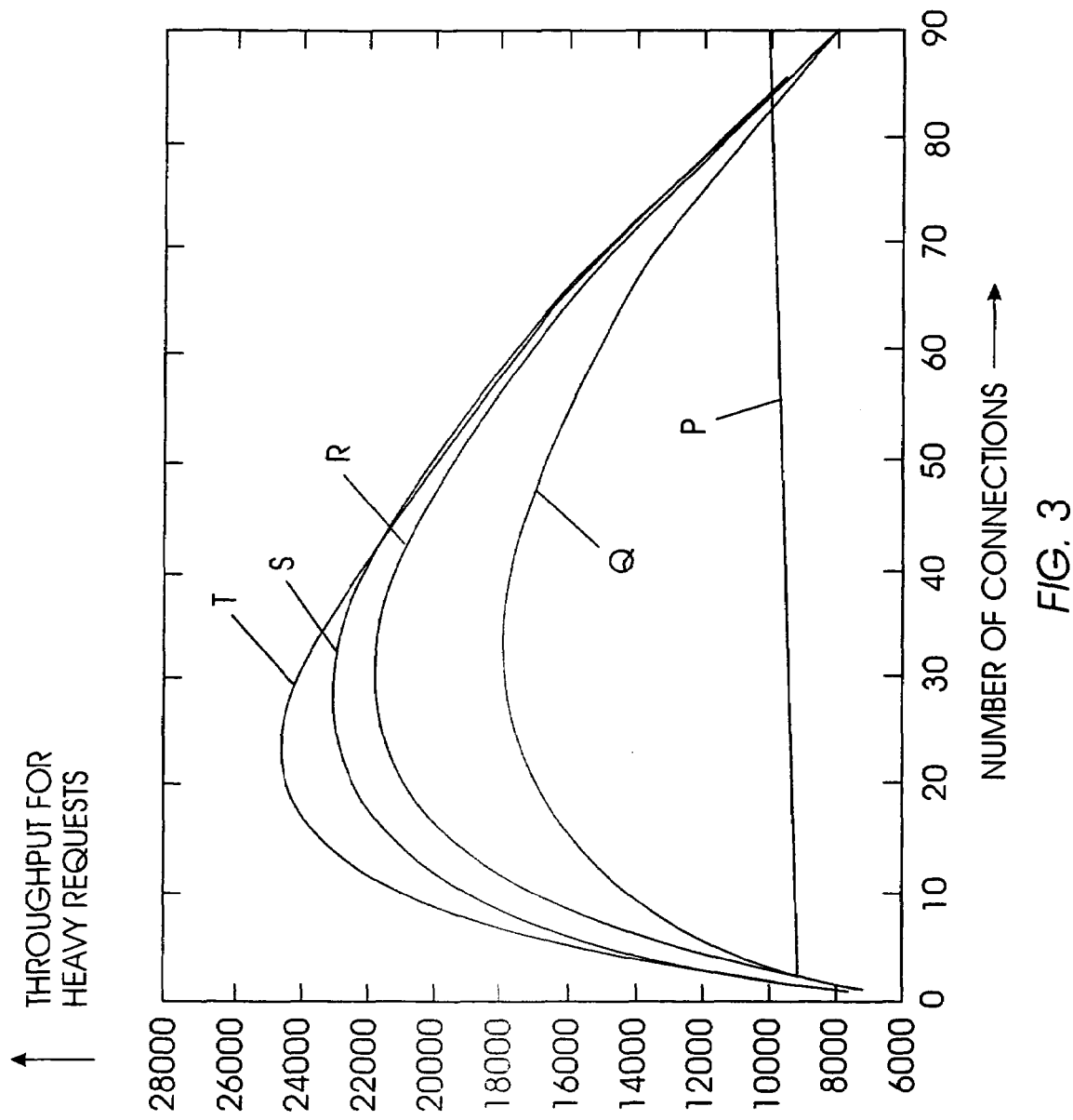
FIG. 3 shows an upper bound on the number of connections, beyond which throughput is not improved by increasing the number of connections.

Although FIGS. 2 and 3 show experimental results, their inclusion within this specification is by way of example only, to show qualitative variations and typical behaviours. In particular, numerical values represented by the curves in FIGS. 2 and 3 are merely exemplary and FIGS. 2 and 3 are not representative of the same experimental data (and so there are differences between the values represented graphically in the figures).

In FIG. 3, the labelled curves each represent a different number of concurrent clients, as follows: P=10; Q=50; R=100; S=200; and T=250. For a given number of concurrent clients, the throughput initially increases as the number of connections increases. Beyond a given number of connections, the throughput rapidly decreases with increases in the number of connections. For example, as shown in curve T in FIG. 3 which represents 250 concurrent clients, throughput rapidly increases with an increased number of connections from 1 to 20. Beyond 20 connections, the throughput rapidly falls.

For light requests (which are neither CPU-intensive nor data-intensive), increasing the number of connections does not give substantial benefits and also the bound on the number of connections is smaller than the case for heavy requests (which are CPU-intensive, data-intensive or both).

Monitoring System Performance

The performance characteristics of the cluster based system indicate that queuing delay (or 'network delay') is a significant determinant of the overall performance of the system—irrespective of the load or the type of load. Concurrency benefits provided by multiple connections (within bounds) can be exploited to reduce the queuing delay and improve the overall performance of the system. In particular, an adaptive system can vary the number of connections as the queuing delay changes to operate in the optimal zone. In the present embodiment, queuing delay is used as the monitored performance characteristic and the number of persistent connections is used as the control parameter to improve the overall performance of the system. The queuing delay (d) is computed at the gateway using the following methodology, as shown in FIG. 4.

Computing the Queueing Delay (d)

Figure 4:
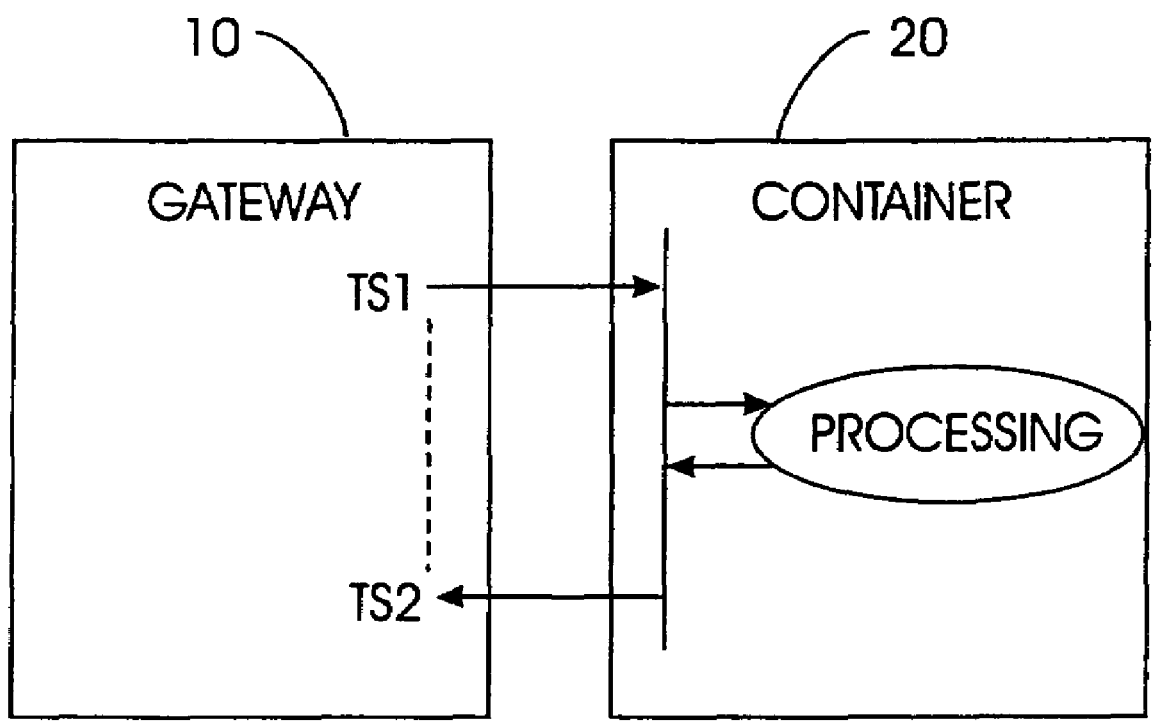
FIG. 4 represents a methodology for computing the queuing delay, according to an embodiment of the invention.

Referring to FIGS. 1 and 4, the front-end (gateway) 10 receives a request from a client 50 and timestamps the request (with timestamp TS1) before forwarding the request to the back-end 20. The timestamp is stored at the gateway 10 as local data in the controlling thread. The back-end receives the request and processes it, and keeps track of the processing time. The back end 20 sends back data indicating the time taken to process the request along with the response. On receiving the response, the front-end again timestamps (TS2) the request and computes the queuing delay using the following equation:

$$d=(TS2-TS1)-\text{Processing time}$$

The gateway maintains two variables "TotalDelay" and "Count" which are initially set to zero. For each completed request, "TotalDelay" is incremented by the value of the delay and "Count" is incremented by 1. At the end of a cycle, the average queuing delay ($d_{AV}$) is calculated by dividing "TotalDelay" by "Count".

To correlate the queuing delay with the number of connections, the system is calibrated (or "benchmarked"). This calibration involves computing a threshold value (t) for the average queuing delay beyond which it is possible to improve the performance by adding extra connections. There is also an upper bound (h) beyond which adding further connections actually degrades the performance, so the system is also calibrated to compute the upper bound. The methods for computing the threshold and upper bound for a number of connections are described below.

Computing the Queuing Delay Threshold (t)

FIG. 2 shows the variation of throughput and queuing delay with client loads for various different numbers of connections. The system is calibrated by plotting throughput and queueing delay against each of the number of connections and the number of concurrent clients (such as in FIGS. 2A, 2B and 3), for both data-intensive and CPU-intensive, requests. For the throughput graph, the performance curves for 1 connection and for (1+a) connections are compared, and a minimum client load is identified at which there is an x% difference in throughput. 'x' is a configuration parameter corresponding to the minimum percentage difference which justifies modification of the number of connections; x will typically vary from system to system. In the present embodiment, factors used in the selection of x include the stability of the system and the desirability of minimizing oscillations in the number of connections. If the value of x is too low, the state of the system is frequently disturbed (for each increment x% in the throughput). For smaller numbers of concurrent clients, modifying the number of connections will not provide significant benefits.

The performance curves shown in FIG. 2A are generated from a set of discrete points, (load, throughput) at various client loads (number of concurrent clients) for a respective fixed number of connections, 1, 1+a, 1+2a . . . . etc. Let us consider the set of discrete points for 1 and 1+a connections. For each client load, the percentage increase in throughput from 1 connection to 1+a connections is found. The increase in throughput is compared with the desired value x, and the corresponding minimum client load at which we get this increase is identified. If there is no exact match, two points are identified such that the desired increase in throughput x lies between the two points. A linear interpolation technique is used to identify the minimum client load at which an x% increase in throughput is achieved by changing from 1 connection to 1+a connections. The selected load point is projected onto the queuing delay curve to find the value of the queuing delay for 1 connection (since the system is initially configured with a single connection to each back-end server). This sequence of steps can be implemented in computer program code, as will be recognized by persons skilled in the art.

The performance curve as shown in FIG. 2B is a set of discrete points, (load, queuing delay) at various client loads for a fixed number of connections, 1, 1+a, 1+2a . . . etc. For the selected load value, the queuing delay is found from FIG. 2B. If the value for the selected load point is not directly available then two points are identified such that the selected load value lies in between the two points. A linear interpolation technique is used to find the queuing delay for the selected load.

This procedure is followed, projecting the load point on the queuing delay curve to provide the threshold queuing delay for CPU intensive requests, tc, and the threshold queuing delay for data intensive requests, td. The minimum of these two values, tcd, is then computed:

$$tcd = \text{minimum}(tc, td)$$

The approach of taking a minimum for different load conditions provides a computed value, tcd, which is the lowest projected threshold queuing delay for CPU-intensive and data-intensive request loads.

From the queuing delay curves (as shown in FIG. 2B), the minimum values of queuing delay for the CPU-intensive (dcm) and data-intensive (ddm) cases are also identified. The value of the queuing delay threshold, t, is then determined as the maximum of tcd, dcm, and ddm:

$$t = \text{maximum}(tcd, dcm, ddm)$$

This taking of a maximum is to safeguard against a potential problem which could arise if the lowest projected queueing delay threshold, tcd, is lower than the minimum for data-intensive and CPU-intensive cases determined separately. If the threshold queuing delay was lower than the minimum for data intensive and CPU-intensive cases, although this is unlikely, the system may never achieve a steady state—the number of connections will be increased repeatedly in an attempt to bring the monitored value of the queuing delay down to-an unachievable value, until the number of connections reaches an upper bound. Taking a maximum after determining the projected minimum, tcd, avoids this potential problem.

Modifications to the number of connections in accordance with this embodiment will tend towards a determined optimum number of connections but may not reach it; this is considered acceptable to ensure the modifications do not degrade performance. In practice, typical load-conditions include a mix of both CPU-intensive and data-intensive requests and the request type of each request is not known in advance of processing the request.

Computing the Upper Bound on the Number of Connections (h)

FIG. 3 shows the variation of throughput with the number of connections for various client loads. The system is calibrated to get similar graphs for data-intensive requests and CPU-intensive requests. The point at which the throughput is at a maximum is identified, and projected to get the corresponding value for the number of connections.

The performance curve as shown in FIG. 3 is a set of discrete points, (connections, throughput) at different connections for a fixed client load. For each client load, the point at which the throughput is a maximum is identified and the corresponding number of connections is noted. The minimum of this value is then found for all the curves.

This procedure is followed to get the upper bound, hc, for the CPU-intensive requests and the upper bound, hd, for the data-intensive requests. The upper bound on the number of connections is selected as the minimum of the two values.

$$h = \text{minimum}(hc, hd)$$

Specific System Architecture and Algorithm

The following description relates to an adaptive cluster-based system which monitors the network delay between the gateway and the container and adds/deletes connections based on this value. As explained above, the system is initially calibrated to determine threshold values.

Figure 5:
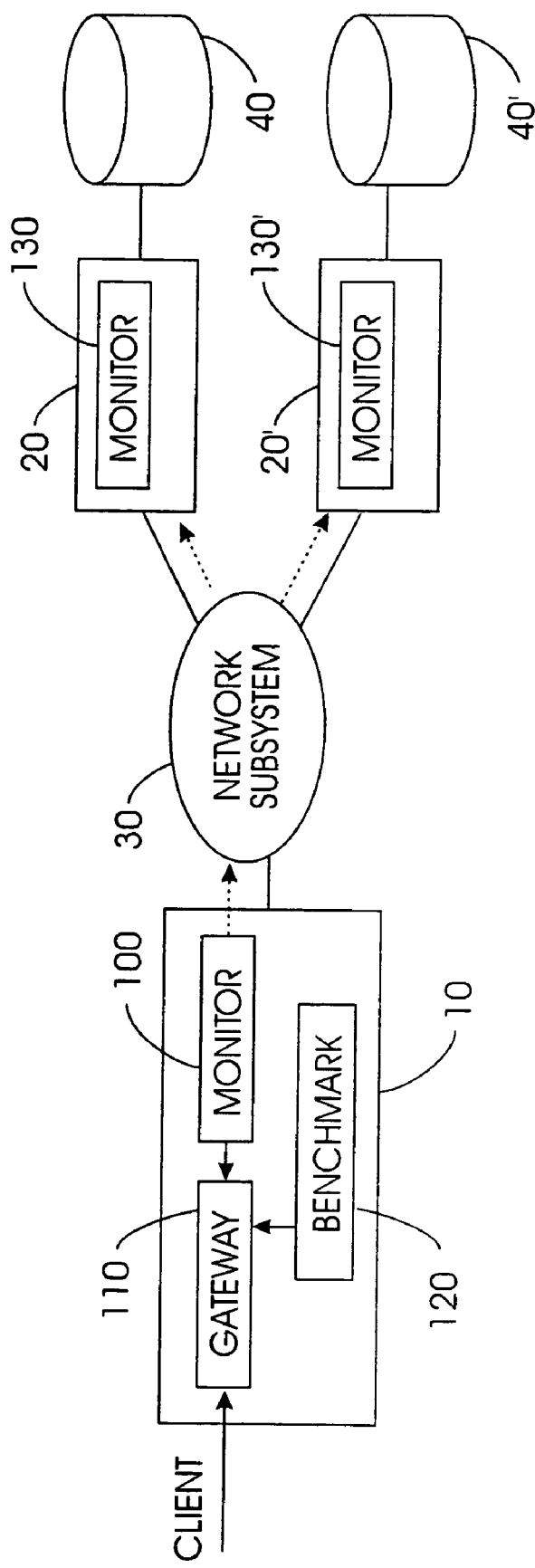
FIG. 5 shows a system architecture according to an embodiment of the invention.

As shown in FIG. 5, the runtime infrastructure includes a monitor 100 and a gateway component 110 at the front-end (gateway) system 10. A benchmark component 120 holds configuration and calibration information for the gateway 110. As described above, with reference to FIG. 4, the monitor 100 keeps track of the queuing delay, d, for each request by timestamping requests when sent and timestamping responses when received and subtracting the processing time measured by a monitor 130 in the back-end system 20. This monitored processing time is returned to the front-end system with the response. The monitor 100 also averages the queueing delays over a period of time (the cycle time). The cycle time is a configuration parameter which can be varied. The delay is compared with the threshold value, t, to decide whether to add/delete a connection. If the average queuing delay, $d_{AV}$, is within y% of the threshold ($t-\{yt/100\} \leq d_{AV} \leq t+\{yt/100\}$), the system is left undisturbed. If the average delay differs from the threshold delay, t, by more than y%, the number N representing a number of connections is changed.

The change, a, in the number of connections is in steps, for example adding or deleting 2 connections at a time (a=2), with the value of a chosen to reduce the tendency for the number of connections to oscillate. The value of the number of connections, N, is checked to see if it is between 1 (the minimum number of connections) and the upper bound, h. If the value is within these bounds, a decision is made regarding whether to add/delete one or more connections. After a decision to add or delete connections, the gateway and the container follow a protocol to add/delete connections as described below. The same process is then repeated at regular intervals (the cycle time).

The sequence of method steps for adapting the number of connections to the current system load is described below with reference to FIG. 6.

Protocol to Add or Delete a Connection

In a direct connection network subsystem, such as TCP/IP, although we keep multiple parallel connections open, the server address does not change for each connection. On the other hand, in mediated connection subsystem such as JMS, each subscriber requires a separate topic and so the front-end and back-end need to co-ordinate the topic names. To solve the naming problem, control is retained at the front-end 10 (see FIG. 5). If the front-end 10 determines a need for an extra connection, the front-end sends a message to the back-end 20 with the desired topic. The back-end 20 starts a new subscriber on the given topic and sends an acknowledgement to the front-end 10. The front-end can then start sending data on the new connection.

Figure 6:
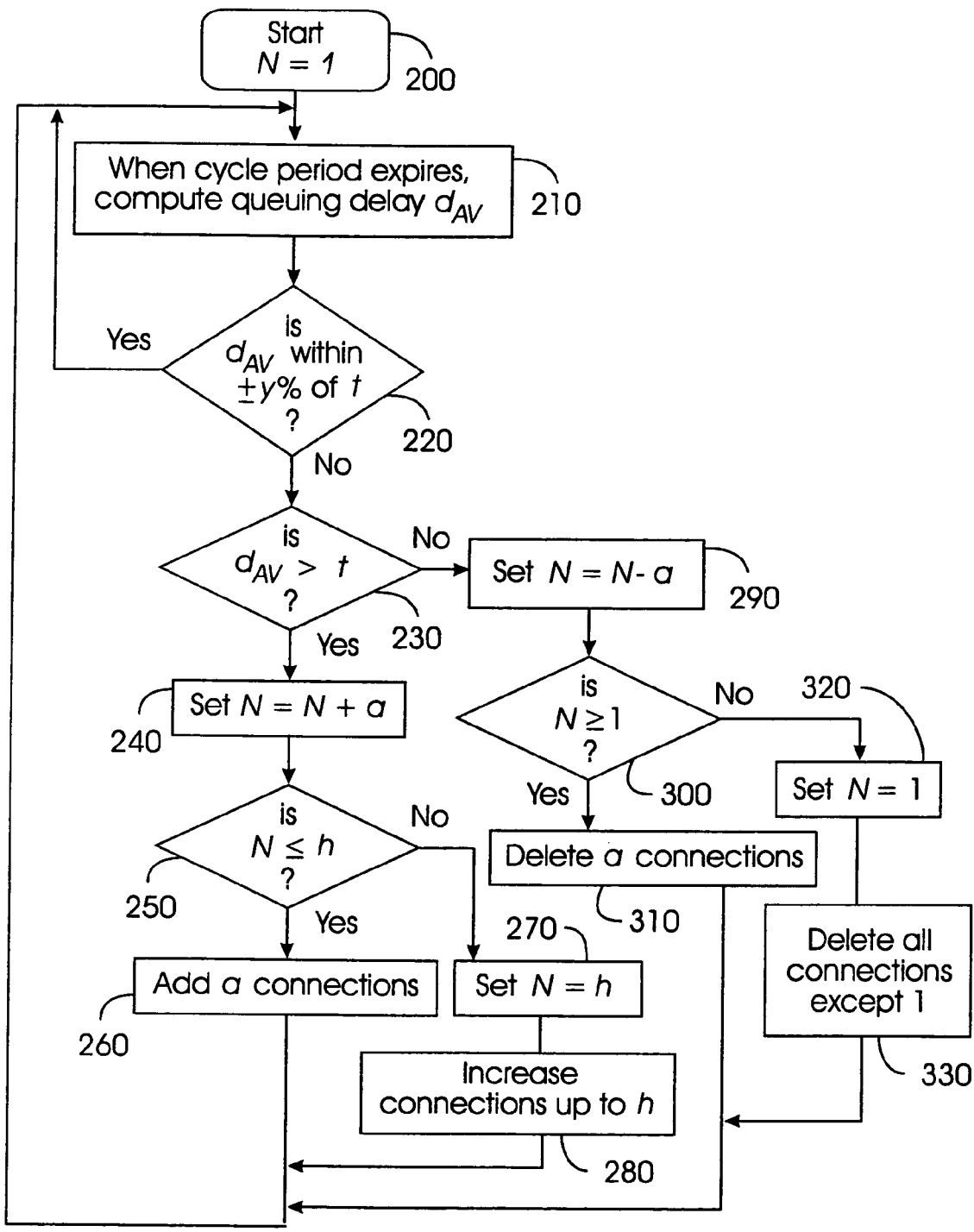
FIG. 6 shows the steps of a method for adding or deleting connections, according to an embodiment of the invention.

As shown in FIG. 6, the process of managing the number of persistent connections starts 200 with a single connection (N=1). When a cycle period expires, the average queueing delay, $d_{AV}$, for the period is computed 210 by the monitor in the front-end system 10, using the queuing delays calculated and saved for each request during the cycle period. A determination is performed of whether the computed average queuing delay, $d_{AV}$, is within a predefined percentage, y%, of the threshold queueing delay, t. If $d_{AV}$ is within y% of t, the potential benefits of modifying the number of connections are deemed not to justify performing the task. Reducing the number of connections could reduce the throughput somewhat and yet increasing the number of connections will not provide substantial benefits (according to the specified x% level).

If the determination in step 220 is negative, such that the average queuing delay, $d_{AV}$, differs from the threshold queuing delay, t, by more than y%, a determination is performed 230 of whether $d_{AV}$ is greater than t. If $d_{AV}$ is greater than t, the value of N (representing the current number of connections) held in a register is increased 240 by an integer value, a, (by setting N=N+a) to obtain a new value representing a potential increased number of connections. Before this new value is used to increase the number of connections, a check is performed 250 of whether the new value of N is less than or equal to the upper bound, h, on the number of connections. If N is less than or equal to h, the number of connections is increased 260 to the new value of N by adding a connections. If the new value of N is above the upper bound h (as determined in step 250), the value of N is reset 270 to the upper bound h (setting N=h) and this new value of N is applied to increase 280 the total number of connections to the upper bound h.

However, if the determination at step 230 determines that the average delay, $d_{AV}$, is not greater than the threshold value, t, (i.e. is less than t by at least y% in view of step 220), the value of N is decremented 290 by an integer value, a. A check is performed 300 of whether the new value of N is greater than or equal to 1.

If the new value N is determined at step 300 to be greater than or equal to 1, the actual number of connections is reduced 310 by the integer value a, by deleting a connections. The newly set value of N is now consistent with the actual number of connections in the system. Alternatively, if the result of the determination at step 300 is that the new value of N is determined to be less than 1, the value of N is reset again 320 (by setting N=1). This new value of N is now applied 330 to the actual number of connections, deleting all except one connection.

Similarly, when a connection needs to be closed, the front-end 10 marks that connection as redundant so that no more requests are sent on that connection. Then the front end 10 sends a message to the back-end 20 with the identification of the last message sent on that topic. When the back-end receives the indicated message, the back-end closes the connection. When the front-end receives a response for that message, it also closes the connection.

In the case of TCP/IP persistent connections, when a connection needs to be added, the gateway opens a new connection with the back-end node and starts sending requests on the connection. When a connection needs to be deleted, the gateway stops sending any new requests on the connection. When all the responses on that connection have arrived, the gateway closes the connection. At the back-end, the closed connection is detected and automatically closed at the back-end also.

The above-described embodiment can work with any container. Thus an adaptive container—which adapts (modifies) its configuration parameters based on the load on the system to maintain the optimal performance—can be used in a system according to an embodiment of the invention.

It will be recognized by persons skilled in the art that various modifications can be made to the example process shown in FIG. 6 within the scope of the present invention. For example, in step 220, it is not essential that the determination of the extent to which the average queuing delay, $d_{AV}$, differs from the threshold value, t, is a determination of a percentage difference—for example maximum and minimum values of t may be used. Furthermore, if a determination is made to continue the process for modifying the number of connections when the average queueing delay exceeds the threshold value t by a particular percentage value y%, a different percentage value z% may be appropriate when considering the extent to which the average queueing delay, $d_{AV}$, is less than the threshold value, t.

Steps 220 and 230 of FIG. 6 could be represented with equal validity as a single determination step. Step 250 could precede step 240, with the performance of step 240 being conditional on the outcome of step 250, in which case step 270 is not required. Similarly, step 300 could precede step 290 with the performance of step 290 being conditional on the outcome of step 300, such that step 320 is not required. The number of connections added, a, at step 260 may differ from the number of connections deleted at step 310 (for example, if usage of the system is characterised by rapid workload increases followed by a less rapid tail-off, or vice versa).

In the embodiment described above in detail, the queueing delay d was computed as a difference between a timestamp on the request and a timestamp on the response, minus the back-end processing time (d=(TS2−TS1)−Processing time). In embodiments in which back-end servers send responses direct to requestor clients without sending them via a dispatcher at the front-end, a notification including the response timestamp TS2 can still be provided to the front-end node to enable calculation of a queueing delay.

In an alternative embodiment, the monitored communication delay is the time between a request being sent from the first data processing unit and the start of processing at the second data processing unit. This requires clock synchronization between the first and second data processing units, but does not require measurement of the processing time or timestamping of responses (and therefore can be advantageous for systems in which the second data processing unit sends responses directly to requestor clients without going via the first data processing unit).

A further alternative embodiment monitors communication delays and modifies the number of connections separately for each of a plurality of back-end nodes within a cluster-based system. A separate monitor and connection manager is provided at the gateway for each of the back-end nodes. Despite the additional complexity of such a solution compared with solutions which modify the number of connections consistently for each back-end node within the cluster, such a solution can be advantageous in a cluster which has different types of connections between the gateway and different back end nodes.

Embodiments of the invention described above can be implemented in cluster-based Web servers, Web application servers and in Web-hosting service implementations. A system which is capable of adapting the number of persistent connections according to an embodiment of the invention can maintain performance when experiencing workloads which would cause degraded performance in many conventional systems.

What is claimed is:

1. A method for managing persistent connections between data processing units of a computer system, wherein a first data processing unit is connected to a second data processing unit to send requests to the second data processing unit for processing, the method comprising the steps of:

monitoring a communication delay period for requests transferred from the first data processing unit to the second data processing unit;

comparing the monitored delay period with a threshold communication delay period to determine whether the monitored communication delay period indicates a predefined performance condition;

in response to determining that the monitored communication delay period indicates a predefined performance condition, adjusting the number of connections between the first and second data processing units, wherein the comparing step comprises determining whether the monitored delay period exceeds a first threshold delay period, wherein the step of adjusting the number of connections is responsive to determining that the monitored delay period exceeds the first threshold to establish at least one additional connection, wherein the comparing step comprises determining whether the monitored delay period is less than a second threshold delay period, wherein the step of adjusting the number of connections is responsive to determining that the monitored delay period is less than the second threshold to close at least one connection, wherein the monitored delay period is calculated by:
computing a difference between (1) a timestamp associated with the transfer of the request from the first data processing unit to the second data processing unit and (2) a timestamp associated with the receipt at the first data processing unit of a response to said request from the second data processing unit, and subtracting a time period measured as the time processing the request within the second data processing unit, wherein the monitored communication delay period is averaged for a set of requests processed during a predefined time period prior to said step of comparing the monitored communication delay period with a threshold communication delay period;

wherein said method further comprises the step of calibrating the system to determine a first threshold communication delay period above which the establishment of at least one additional connection is expected to reduce the communication delay period, wherein the step of calibrating the system to determine a first threshold comprises:
monitoring communication delay periods and corresponding request throughput information for different numbers of concurrent clients and different numbers of persistent connections;
determining a minimum number of concurrent clients at which a predefined percentage increase in throughput can be achieved by increasing the number of persistent connections by an integer value, a, between the first and second data processing units;
identifying, with reference to the monitored communication delay periods; and
corresponding request throughput information, a communication delay period corresponding to the determined minimum number of concurrent clients, wherein the step of calibrating the system is performed separately for each of CPU-intensive requests and data-intensive requests, and the step of calibrating comprises the additional step of selecting a minimum communication delay period from the identified communication delay period for CPU-intensive requests and the identified communication delay period for data-intensive request, wherein said method further comprises the step of using said calibration of the system to determine a second threshold communication delay period below which the closing of at least one connection is not expected to significantly increase the communication delay period, wherein the first and second threshold communication delay periods are computed as percentage differences from a selected minimum communication delay period, wherein said method further comprises the step of performed prior to the step of establishing at least one additional connection, of checking whether the adjusted number of connections would exceed a maximum permitted number of connections, wherein the step of establishing the at least one additional connection is performed only if the adjusted number of connections would not exceed the maximum permitted number, wherein said method further comprises the step of monitoring communication delay periods and corresponding request throughput information for different numbers of concurrent clients and different numbers of persistent connections, wherein said method further comprises the step of determining the maximum permitted number of connections by: identifying a maximum throughput, for different numbers of concurrent clients, from the monitored request throughput information; identifying a number of persistent connections corresponding to said identified maximum throughput for each respective number of concurrent clients; and selecting a minimum from said identified numbers of persistent connections, wherein the first data processing unit is a front-end network gateway node of a cluster-based data processing system, and the second data processing unit is a back-end processing node of the cluster-based data processing system, wherein said method further comprises the step of the gateway node receiving requests from a client requestor via a network, passing received requests to respective ones of a set of back-end processing nodes, receiving responses from the respective back-end processing nodes, and forwarding received responses to the client requestor; and wherein said method further comprises the step of the back-end processing node processing requests received from the gateway node to generate responses, and forwarding the responses to the gateway node, wherein the cluster-based data processing system comprises a plurality of back-end processing nodes, and wherein the method is responsive to monitored communication delays for the plurality of back-end processing nodes to modify the number of persistent connections consistently for the plurality of back-end processing nodes.

* * * * *